US010336452B1

(12) United States Patent
Jia (10) Patent No.: US 10,336,452 B1
(45) Date of Patent: Jul. 2, 2019

(54) DRONE WITH NO EXTERNAL PROPELLER BLADES

(71) Applicant: Muye Jia, Guangzhou (CN)

(72) Inventor: Muye Jia, Guangzhou (CN)

( * ) Notice: Subject to any disclaimer, the term of this patent is extended or adjusted under 35 U.S.C. 154(b) by 0 days.

(21) Appl. No.: 16/009,999

(22) Filed: Jun. 15, 2018

Related U.S. Application Data (60) Provisional application No. 62/658,095, filed on Apr. 16, 2018.

(51) Int. Cl.
 B64C 29/00 (2006.01)
 B64C 39/02 (2006.01)

(52) U.S. Cl.
 CPC ........ B64C 39/024 (2013.01); B64C 29/0066 (2013.01); *B64C 2201/02* (2013.01); *B64C 2201/108* (2013.01); *B64C 2201/162* (2013.01)

(58) Field of Classification Search
 CPC . B64C 29/0016; B64C 29/0025; B64C 39/06; B64C 39/064; B64C 2201/10; B64C 2201/108; B64C 2211/00; B64C 2230/28; B64C 29/0066; B64D 27/02
 See application file for complete search history.

(56) References Cited

U.S. PATENT DOCUMENTS 3,061,243 A * 10/1962 Simon ................. B64C 29/0025
 244/23 B
3,176,934 A * 4/1965 Kappus ............... B64C 29/0025
 244/12.3
3,267,667 A * 8/1966 Erwin ................. B64C 29/0016
 244/23 B
3,273,339 A * 9/1966 Borysthen-Tkacz .......................
 B64C 29/0025
 239/265.29
3,785,592 A * 1/1974 Kerruish ............... B64C 39/064
 244/12.2
5,312,069 A * 5/1994 Bollinger ................ F02K 3/068
 244/12.3

(Continued)

FOREIGN PATENT DOCUMENTS

KR 1020170116814 * 10/2017 ........... B64C 39/024
WO WO-2017034359 A1 * 3/2017 ............. B64C 39/02

OTHER PUBLICATIONS

Fauzan, Pemuda Indonesia Pencipta Prototipe Bladeless Drone, Oct. 17, 2016 (with translation) https://daily.oktagon.co.id/fauzan-pemuda-indonesia-pencipta-prototipe-bladeless-drone/.*

*Primary Examiner* — Joseph W Sanderson
(74) *Attorney, Agent, or Firm* — Bay State IP, LLC (57) ABSTRACT

A drone having a main housing unit, wherein a set of turbines, a speed controller and an electrical controlling unit are located and is powered by an engine without the necessity for external propellers such that the "blade-less" engines allows the propellers (or blades) to remain hidden instead of removing them from the overall system. A power source is located within a main housing of the drone system that allows for accelerated airflow for the blade-less engine thus lifting the drone up in the air. The turbines facilitate air flow radially outward from a center of the main housing unit, wherein air is fed to the turbines through an air intake unit at the top of the main housing unit and is then accelerated by the turbines through a plurality of arm units, which force the air into an inlet tunnel located along the perimeter of a nozzle.

14 Claims, 8 Drawing Sheets

(56) References Cited

U.S. PATENT DOCUMENTS

| | | | | |
|---|---|---|---|---|
| 8,177,527 | B2* | 5/2012 | Ishiba | B64C 11/001 |
| | | | | 415/199.4 |
| 8,646,721 | B2* | 2/2014 | Chapman | B64C 27/20 |
| | | | | 239/265.39 |
| 8,973,861 | B2* | 3/2015 | Zhou | A63H 27/12 |
| | | | | 244/17.23 |
| 9,004,973 | B2* | 4/2015 | Condon | A63H 13/00 |
| | | | | 446/37 |
| 9,061,763 | B1* | 6/2015 | Christensen | A63H 17/28 |
| 9,199,733 | B2* | 12/2015 | Keennon | B64C 27/12 |
| 9,567,076 | B2* | 2/2017 | Zhang | B64C 1/00 |
| 9,926,077 | B2* | 3/2018 | Matus | B64C 39/024 |
| 10,093,418 | B2* | 10/2018 | Lim | B64C 27/08 |
| 10,099,784 | B1* | 10/2018 | Nilson | B64C 39/024 |
| 2014/0117149 | A1* | 5/2014 | Zhou | A63H 27/12 |
| | | | | 244/17.23 |
| 2014/0231582 | A1* | 8/2014 | Headrick | B64C 27/08 |
| | | | | 244/54 |
| 2015/0245516 | A1* | 8/2015 | Christensen | A63H 17/28 |
| | | | | 362/470 |
| 2015/0336670 | A1* | 11/2015 | Zhang | B64C 1/00 |
| | | | | 244/119 |
| 2017/0015418 | A1* | 1/2017 | Matus | B64C 39/024 |
| 2017/0057621 | A1* | 3/2017 | Evulet | B64C 9/38 |
| 2017/0113798 | A1* | 4/2017 | Lee | B64C 39/024 |
| 2017/0217559 | A1* | 8/2017 | Peng | B64C 25/08 |
| 2017/0217562 | A1* | 8/2017 | Schalla | B64C 1/34 |
| 2017/0240275 | A1* | 8/2017 | Evulet | B64C 9/38 |
| 2018/0022451 | A1* | 1/2018 | Lim | B64C 27/08 |
| | | | | 244/17.23 |

* cited by examiner

DRONE WITH NO EXTERNAL PROPELLER BLADES

CROSS REFERENCE TO RELATED APPLICATION

This application claims the benefit of and takes priority from U.S. Provisional Patent Application Ser. No. 62/658,095, filed on Apr. 16, 2018, the contents of which are herein incorporated by reference.

BACKGROUND OF THE INVENTION

Field of the Invention

The present disclosure relates generally to unmanned aircraft vehicles or "drones", and more particularly to a drone system that incorporates an engine design without the need for external blades and instead possesses hidden blades as a source of lift.

Description of the Related Art

There exist several drones capable of maneuvering and performing tasks in airspaces that are densely crowded with obstacles, such as solid barriers, people and animals. However, other known drones are unable to safely operate in such areas due to the possibility of a collision, which could injure people, destroy property, and result in catastrophic damage to the drone itself. An advance in the art may encompass a drone with similar mobility that can collide into barriers and obstacles without any potential for serious harm.

SUMMARY OF THE INVENTION

The instant drone embodiments disclosed provide a unique system that removes the need for external blades rotating on the outside of the drone, thus eliminating a potential safety issue while operating in dense urban environments. Thus, the several embodiments of the instant system are illustrated herein.

A primary object of the drone system is to provide a drone that is powered by an engine without the necessity for external propellers such that the "blade-less" engines allows the propellers (or blades) to remain hidden instead of removing them from the overall system.

Another object of the drone system is to provide a power source located within a main housing of the drone system that allows for accelerated airflow for the blade-less engine thus lifting the drone up in the air.

Another object of the drone system is to provide a drone that does not possess external propellers rotating on the outside of the drone, thus eliminating a potential safety issue while operating in dense urban environments.

Yet another object of the instant device is to provide a drone system with an aerodynamic configuration that allows for the engine to possess greater thrust and better overall performance characteristics.

In one embodiment, a drone is disclosed, wherein the drone includes a saucer-shaped main housing unit, and inside the main housing unit there may exist a set of various compartments. Preferably, some of the main components which may be located within the main housing unit are a set of turbines, speed controller, and electrical controlling unit. In this embodiment, the turbines facilitate air flow radially outward from the center of the main housing unit, wherein air is fed to the turbines through an air intake unit at the top of the main housing unit and is then accelerated by the turbines through a plurality of arm units, which force the air into an inlet tunnel located along the perimeter of a nozzle, thus forcing the air perpendicularly downward, causing lift.

The turbines' placement inside the main housing unit of the drone protect them from damage in the incident of a collision and protect people and property with which the drone may collide. Such placement also provides an opportunity for the development of new methods of control, which may be more efficient and precise than current unmanned aerial vehicles.

Furthermore, thrust is generated by the nozzle portion at the end of the arm unit and the inlet tunnel through which air exits is obstructed such that the air may only exit through substantially less than the full circumference of the nozzle which in turn increases the speed, and hence thrust, produced by the nozzle.

In several embodiments, the power source for the turbines may vary depending on the application and usage of the drone along with how the turbines are installed in the main housing unit. As known in the art, when assessing power output:

$V_f$ (outlet velocity) of the main housing unit and $V_{f1}$ (velocity of the flow) from the nozzle may be collected through data based on numerical simulation, whereas the thrust of the turbines is calculated when they are at rest. Therefore, assuming the engine is a fixed control volume and the flow through it is incompressible:

$$\sum F_x = \frac{d}{dt}\left(\int\int \rho \vec{v} dV\right) + \int\int \vec{v}\rho(\vec{v}\cdot\vec{n})dA$$

Since the flow is incompressible, the density p is a constant, and the change of velocity in the control volume that surrounds the engine is negligible, so the first term is zero; the formula can be reduced to:

$$\sum F_x = \frac{d}{dt}\left(\int\int\int \rho \vec{v} dV\right) + \int\int \vec{v}\rho(\vec{v}\cdot\vec{n})dA$$

The velocity here is the average velocity of $V_f$ and $V_{f1}$.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

To the accomplishment of the foregoing and related ends, certain illustrative aspects are described herein in connection with the following description and the annexed drawings. These aspects are indicative of the various ways in which the principles disclosed herein can be practice and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

Advantages of the present apparatus will be apparent from the following detailed description of exemplary embodiments thereof, which description should be considered in conjunction with the accompanying drawings, in which, having thus described the system in general terms, reference will now be made to the accompanying drawings, which are not necessarily drawn to scale, and wherein.

DETAILED DESCRIPTION OF THE SEVERAL EMBODIMENTS

The detailed description set forth below in connection with the appended drawings is intended as a description of presently-preferred embodiments of the apparatus and does not represent the only forms in which the present apparatus may be constructed and/or utilized. The description sets forth the functions and the sequence of steps for constructing and operating the apparatus in connection with the illustrated embodiments. However, it is to be understood that the same or equivalent functions and sequences may be accomplished by different embodiments that are also intended to be encompassed within the spirit and scope of the invention.

For the following defined terms, these definitions shall be applied, unless a different definition is given in the claims or elsewhere in this specification. All numeric values are herein assumed to be modified by the term "about", whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following description should be read with reference to the drawings wherein like reference numerals indicate like elements throughout the several views. The drawings, which are not necessarily to scale, depict illustrative embodiments of the claimed invention.

Figure 1:
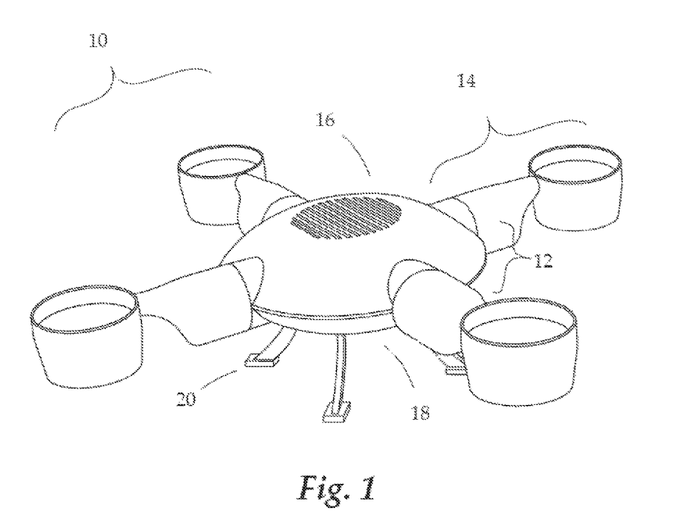
FIG. 1 is front perspective view of a fully assembled drone system.

FIG. 1 illustrates a perspective view of one embodiment of a drone 10, wherein the drone 10 comprises a main housing unit 12 and a plurality of arm units 14 extending outwardly from the main housing unit 12. In one embodiment, the main housing unit 12 further comprises an upper shell 16 (shown in FIG. 3) and a lower shell 18 (shown in FIG. 5). Preferably, the lower shell 18 comprises a plurality of legs 20 that extend downwardly from the lower shell 18 to support the drone 10.

Figure 2:
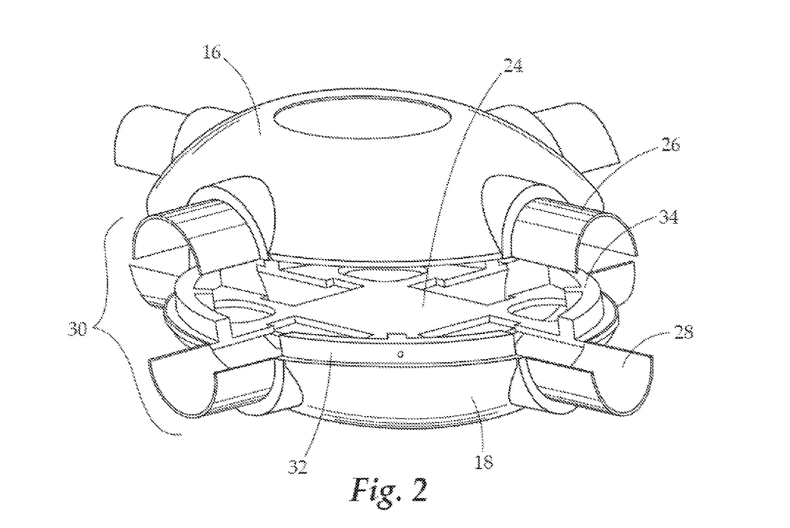
FIG. 2 is a perspective view of a main housing unit of the drone in a disassembled configuration.

FIG. 2 illustrates an embodiment of the main housing unit 12 (shown in FIG. 1) prior to assembly, wherein the upper shell 16 and the lower shell 18 are not yet coupled together. In this embodiment, a first platform 22 (shown in FIG. 5) located on the upper shell 16 and a second platform 24 located on the lower shell 18 enable the upper shell 16 to mate with the lower shell 18 during assembly.

In this embodiment, the upper shell 16 comprises a plurality of upper channels 26 extending radially outward around the upper shell 16. The lower shell 18 of the main housing unit 12 comprises a corresponding number of lower channels 28 extending radially outward around the lower shell 18, such that each upper channel 26 and each lower channel 28 mate when the upper shell 16 and lower shell 18 are assembled to form a plurality of conduits 30. Once assembled, each conduit 30 is able to receive an arm unit 14.

In one embodiment, an even number of upper channels 26 and lower channels 28 are equidistantly spaced around the respective upper shell 16 and lower shell 18, such that when mated, an even number of symmetrically opposed conduits 30 form. In yet another embodiment, the upper shell 16, bottom shell 18, the first and second platforms 22, 24, and the conduits 30 are composed of a lightweight Acrylonitrile Butadiene Styrene (ABS) plastic or similar polymer.

Preferably, the second platform 24 of the lower shell 18 includes a rim 32 extending around and upwardly from the second platform 24 and wherein the rim 32 comprises a plurality fastener inserts 34 designed to mate and secure the upper shell 16 with the lower shell 18. In this embodiment, the rim 32 of the lower shell 18 is interrupted by the lower channels 28.

Figure 3:
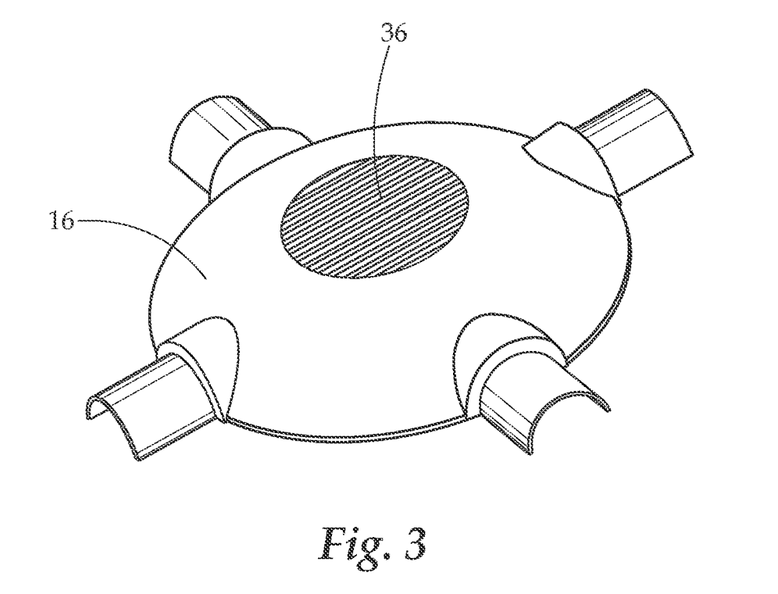
FIG. 3 is a top perspective view of an upper shell of the main housing unit of the drone.

FIG. 3 illustrates a top perspective view of the upper shell 16 alone, wherein the upper shell 16 is preferably constructed as a shallow bowl-shape to improve the aerodynamic characters of the drone 10. In this embodiment, the upper shell 16 is interrupted at an apex by an air intake unit 36 for facilitating airflow into the main housing unit 12 to enable the drone 10 to lift off of the ground.

Figure 4:
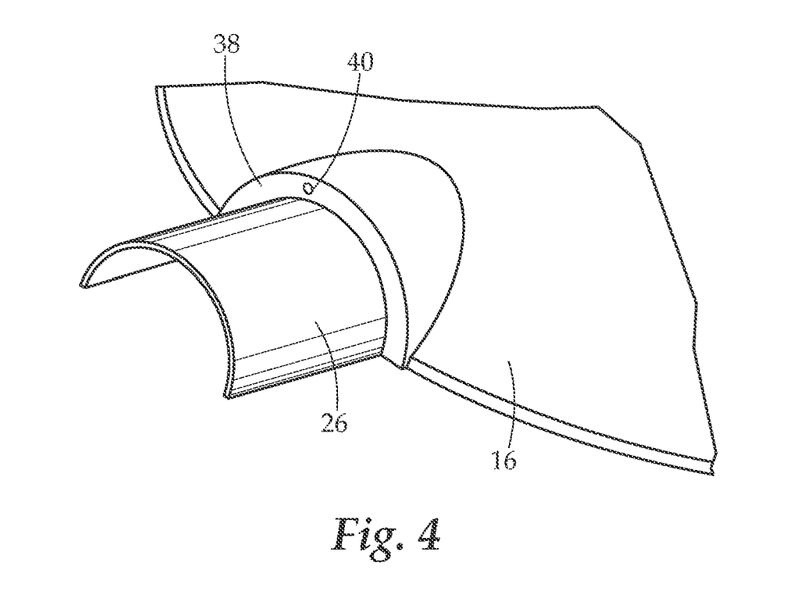
FIG. 4 is a perspective of an arm unit extending outwardly from the upper shell of the main housing unit of the drone.

FIG. 4 illustrates a close-up view of one of the upper channels 26 located on the upper shell 16. In one embodiment, a corresponding arm unit 14 is attached to the main housing unit 12 by sliding over the respective conduit 30 until the arm unit 14 butt-up against a conduit rim 38 of the conduit 30. Preferably, the surface of the upper channels 28 and the lower channels 30 is composed of a high-friction-coefficient material, which helps secure the arm units 14 (shown in FIG. 1) to the conduits 30 after assembly of the main housing unit 12. Each arm unit 14 is further secured to the main housing 12 via the fastener inserts of each arm 14 in correspondence with the fastener apertures or holes 40 on the conduit rim 38.

Figure 5:
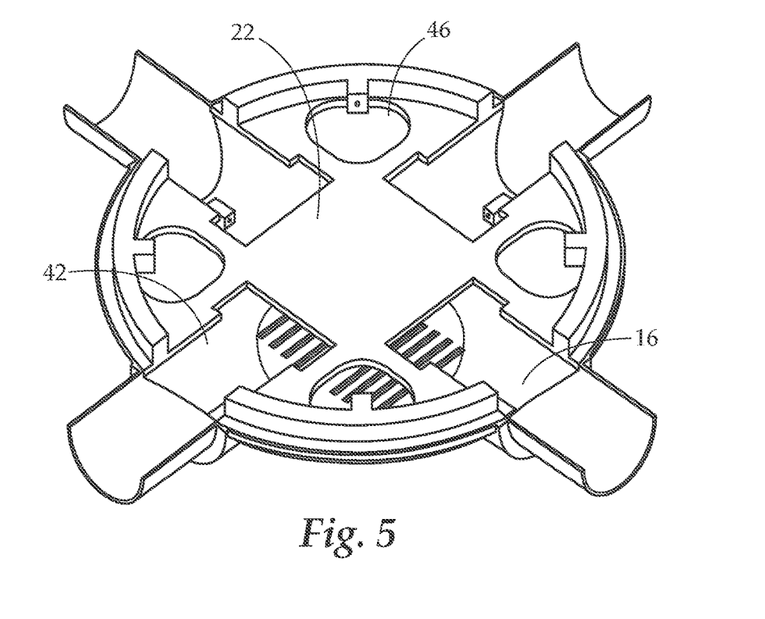
FIG. 5 is a perspective bottom view of the upper shell.

FIG. 5 is a bottom perspective view of the first platform 22 located in the upper shell 16. In one embodiment, the first platform 22 comprises a plurality of first turbine cribs 42, which enable a turbine 44 to be situated within the turbine crib 42 (shown in FIG. 6) to allow each turbine 44 to face radially outward.

Preferably, the first platform 22 comprises an even number of equidistant and symmetrically opposed turbine cribs 42. In this embodiment, housing the turbines 44 within the main housing unit 12 of the drone 10 improves the durability and safety of the drone 10 by shielding each blade 84 (shown in FIG. 11) of the turbines 44 from contact with obstacles and debris. This enables the drone 10 to operate safely in areas with high-density population and obstacles, such in airspaces above city streets and indoors.

Additionally, in another embodiment, a plurality of cavities 46 may exist within the first platform 22 in order to reduce the weight of the drone 10 and facilitate the free movement of air within the main housing unit 12, while still maintaining structural integrity.

Figure 6:
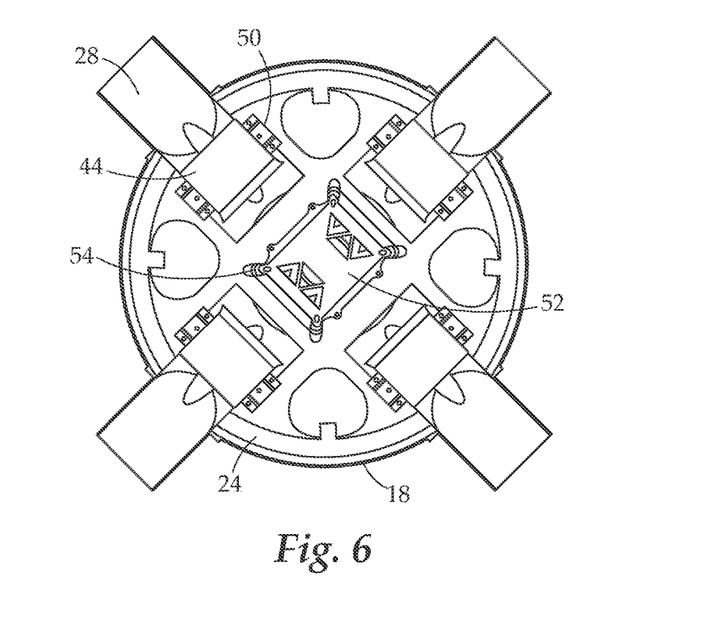
FIG. 6 is a top view of a lower shell of the main housing of the drone with a plurality of turbines located within the lower shell.

FIG. 6 is a top view of the second platform 24 located in the lower shell 18 and displaying the plurality of turbines 44 intact. In this embodiment, each turbine 44 fits into a corresponding second turbine crib 48 and is affixed to the second platform 24 via a pair of turbine brackets 50. When the upper shell 16 (shown in FIG. 5) is attached to the lower shell 18 to form the fully assembled main housing unit 12, the first platform 22 interlocks with the second platform 24, and each first turbine crib 42 mates with a corresponding second turbine crib 48 to form a turbine housing which holds each turbine 44 in place.

Each of the turbines 44 face radially outward such that the turbines 44 blows air from inside of the main housing unit 12 (shown in FIG. 1) through the conduits 30. Since the turbines 44 create outward, rather than downward airflow, the direction of the torque reaction exerted on the drone 10 by any given turbine 44 depends on the radial direction each turbine 44 faces. The symmetrically opposed positioning of each turbine 44 in the main housing unit 12 therefore creates a net torque reaction of zero when the blades 84 (shown in FIG. 11) of oppositely positioned turbines 44 spin in the same rotational direction at the same velocity.

In another embodiment, a center bracket 52 is affixed to the center of the second platform 24, and supports the plurality of legs 20 (shown in FIG. 1) that extend downwardly from the lower shell 18 to support the drone 10 while on the ground, and to protect the main housing unit 12 and arm units 14 from damaging contact with the ground. The plurality of legs 20 are affixed to the center bracket 52 at a plurality of attachment points 54.

Figure 7:
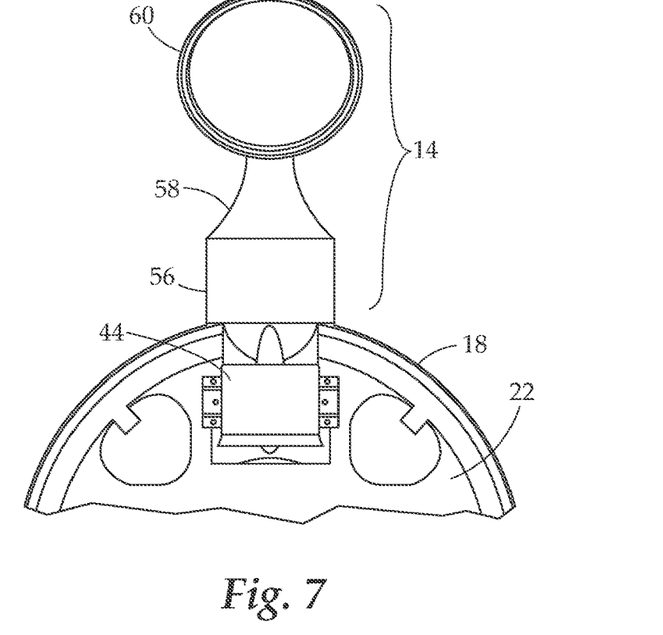
FIG. 7 is a top view of a turbine located on the lower shell and an arm unit coupled with a lower channel extending from the lower shell.

FIG. 7 is a top perspective view of the second platform 22 located in the lower shell 18 displaying the turbine 44 inside the second turbine crib 48, and the arm unit 14 slid over the lower channel 28 (the fully assembled main housing unit 12 would include the mated lower channel 26 and upper channel 28, which form the conduit 30 for the arm unit 14 to slide onto; however, FIG. 6 omits the upper channel 28 to facilitate viewing of the internal components). Each arm unit 14 comprises a cylindrical channel 56, which attaches the arm unit 14 to the main housing unit 12 by sliding over the conduit 30 (shown in FIG. 2). Each arm unit 14 further comprises a tapered channel 58 and a ring-shaped nozzle 60.

Figure 8:
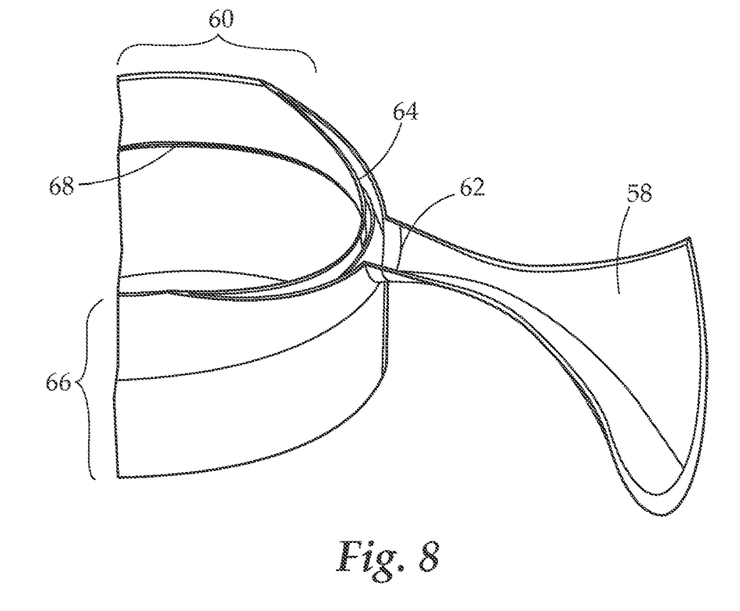
FIG. 8 is a horizontal cross-section view of one arm unit.
Figure 9A:
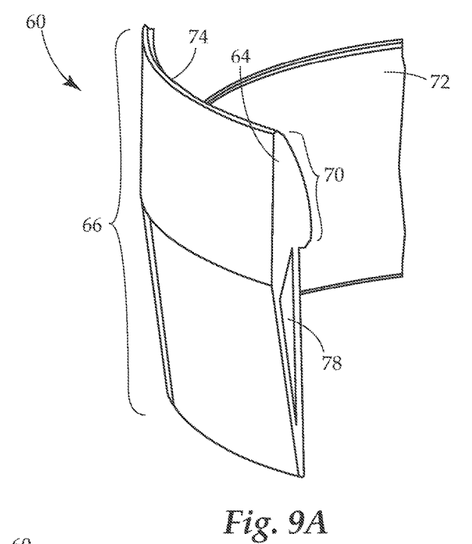
FIGS. 9A-9B illustrates a pair of cross-sectional perspective views of the nozzle and inlet tunnel contained within the nozzle.
Figure 9B:
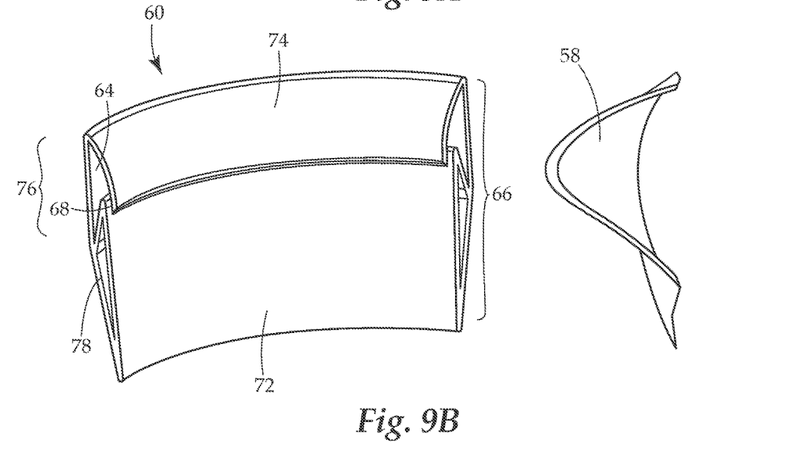

FIG. 8 illustrates a perspective cross-sectional view of a junction 62 between the tapered channel 58 and the nozzle 60. In this embodiment, air flows from the tapered channel 58, through the junction 62, and then into the nozzle 60, and around an upper passage 64 (shown in FIG. 9) of the ring comprising the nozzle 60. The upper passage 64 preferably spans the entire circumference and vertical length 66 of the nozzle 60, such that air flows throughout the entirety of the hollow nozzle 60. Airflow is then forced downward through an outer channel 68, which lines the inner surface of the nozzle 60. Air flow out of the outer channel 68 creates thrust, which lifts the drone 10. The outer channel 68 does not, however, span the entire circumference of the nozzle 60. A closed portion 70 of the nozzle 60 (shown in FIG. 9) obstructs airflow out of the outer channel 68. Decreasing the area through which air can exit the outer channel 68, increases the speed at which air exits the nozzle 60, and therefore improves the amount of lift generated by the nozzle 60.

FIGS. 9A-9B illustrates a perspective view of the nozzle 60, a view of the bottom of the nozzle 60, a close-up vertical cross-section view of an open portion 76 of the nozzle 60, and a close-up vertical cross-section view of the closed portion 70 of the nozzle 60. Airflow entering through the junction 62 travels through the entire circumference of the nozzle 60, and is forced downward along an inner wall 72 of the nozzle 60 by an upper lip 74. The upper lip 74 further comprises a thin, curved ABS plastic lip extending downward from the top of the entire circumference of the nozzle 60 such that it creates the outer channel 68 between the inner wall 70 and the upper lip 74, through which air can escape at a high velocity. The outer channel 68 does not, however, span the entire circumference of the nozzle 60. In one embodiment, the closed portion 70 of the nozzle 60 (represented as the hashed portion of the nozzle 60), consists of a portion of the nozzle 60, in which the inner wall 72 extends upward to connect with the upper lip 74 and the upper passage 64 is obstructed, which prevents airflow from exiting the outer channel 68. The closed portion 70 of the nozzle 60, therefore does not facilitate airflow around the circumference of the nozzle 60, and increases the velocity of air flow out of the open portion 76 of the nozzle 60. By reducing the surface area through which air flux occurs, the velocity of the air exiting the nozzle 60 increases, and the amount of lift produced increases. The decreased surface area through which air can escape the nozzle 60 allows the drone 10 to fly despite the decreased air intake that results from housing the turbines 44 internally. The inner chamber 78 comprises a hollow portion of the nozzle 60, which extends around the entire circumference of the nozzle 60. The inner chamber decreases the nozzle's 60 weight.

Figure 10:
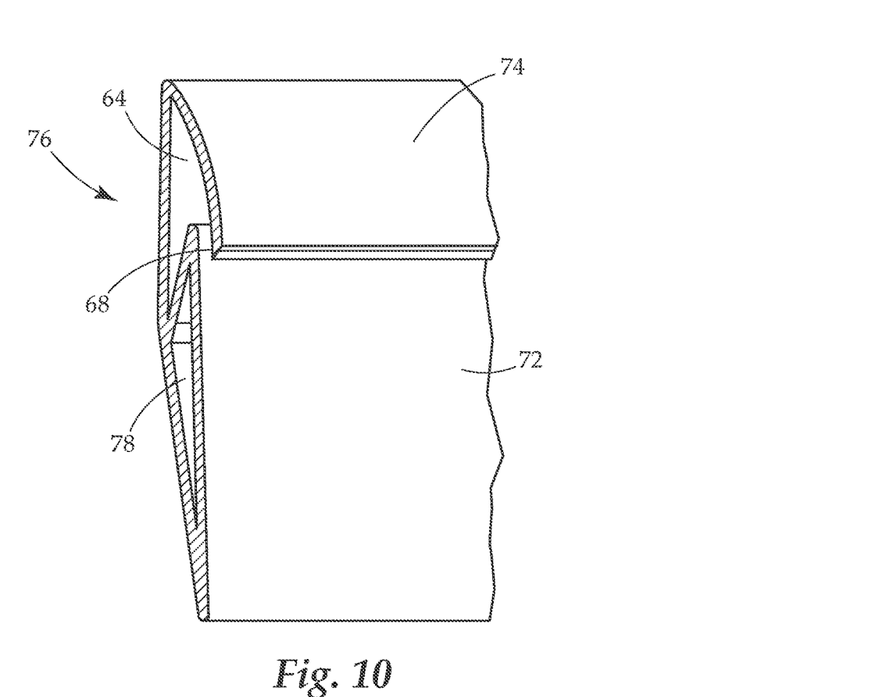
FIG. 10 illustrates a close-up vertical cross-sectional view of the open portion of the nozzle.

FIG. 10 illustrates a close-up vertical cross-sectional view of the open portion 76 of the nozzle 60. In this embodiment, the upper lip 74 embodies a thin curved surface, which guides lateral air flow from the upper passage 64 through the outer channel 68 and downward along the inner wall 72 to create lift.

Figure 11:
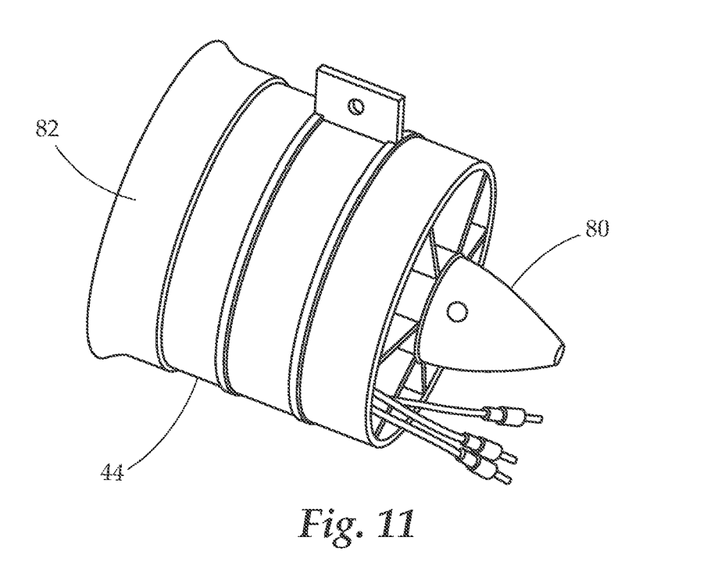
FIG. 11 is a perspective view of an outward facing end of the turbine.

FIG. 11 is a perspective view of an outward facing end 80 of the turbine 44. In one embodiment, air is fed from outside the drone 10 (shown in FIG. 1), through the air intake unit 36 (shown in FIG. 3), through the hollow body of the main housing unit 12 (shown in FIG. 2), into an inward facing end 82 of the turbine, accelerated by the fan blades 84 (shown in FIG. 12) through the body of the turbine 44, through the outward facing end 80, and into the arm unit 14. Each turbine 44 preferably comprises a ducted fan capable of generating up to 25 N of force.

Figure 12:
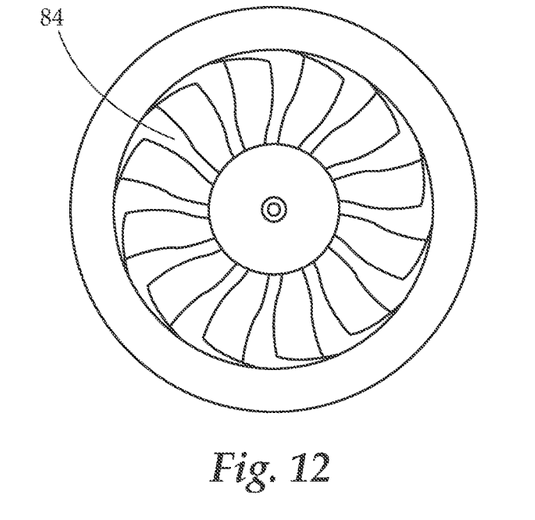
FIG. 12 is a view from the front of the turbine looking into the blades.

FIG. 12 is a view from the front of the turbine 44 looking into the blades 84.

Figure 13:
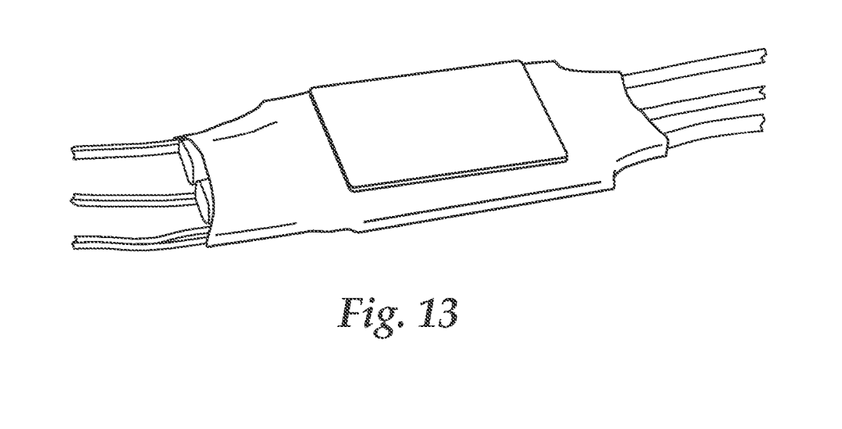
FIG. 13 shows an electronic speed control for remote control of each ducted fan.

FIG. 13 shows an electronic speed controller 88 for remote control of each ducted fan. This embodiment of the speed controller 88 comprises a Hobbywing SkyWalker 60A Brushless ESC Speed Controller with UBEC. In one embodiment, each turbine 44 is electronically connected to a speed controller at connection point 86 (shown in FIG. 11).

Figure 14:
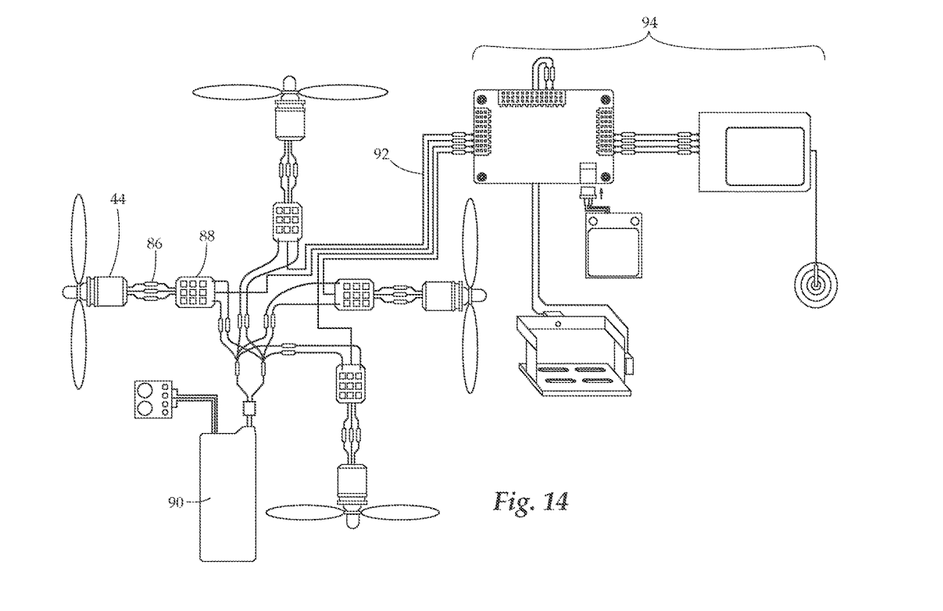
FIG. 14 illustrates an exemplary embodiment of an electronic configuration for the drone.

FIG. 14 shows a typical quadcopter electrical control system layout. In one embodiment, each of the turbines 44 are connected to a speed controller at connection point 86 (the diagram depicts exposed fan blades, however, in the present embodiment, the turbines 44 will house the ducted fan blades 84). In another embodiment, all of the speed controllers 88 will be connected to a single battery 90, which serves as the power source for the drone 10. The battery may be connected to numerous other electrical components, which are not pictured in this embodiment. servo connectors 92 connect the turbines to a number of other electrical components 94, which may include an ArduPilot Flight Control Board, a receiver, GPS module, 2 Axis Gimbal, and antenna.

What is claimed is:

1. A drone, comprising:
    a main housing unit, wherein the main housing unit comprises:
        an upper shell;
        a lower shell; and
        an internal platform that connects the top shell to the bottom shell;
    a plurality of conduits extending radially outward from the main housing unit;
    a plurality of turbines located within the main housing unit, wherein each turbine faces radially outward and aligns with a corresponding conduit;
    a plurality of arms extending outwardly from the main housing unit, wherein each arm is attached to the main housing unit by mating to a corresponding conduit;
    a plurality of nozzles, wherein each nozzle is connected to a corresponding arm and comprises:
        a cylindrical ring, wherein the cylindrical ring comprises an upper passage and an outer channel that extends along an inner circumference of the nozzle;
    wherein the upper passage comprises an uppermost volume of space inside the nozzle directly adjacent to the outer channel, and wherein airflow may enter the upper passage through a junction and exit out of the outer channel; and
    an open and closed portion of the upper passage.

2. The drone of claim 1, wherein the upper and lower shells comprise a bowl shape.

3. The drone of claim 2, wherein the drone comprises an air intake unit located in the upper shell.

4. The drone of claim 3, wherein the lower shell comprises a plurality of legs.

5. The drone of claim 1, wherein each turbine comprises a ducted fan.

6. The drone of claim 1, wherein the upper and lower shells each comprise a bowl shape comprising a plurality of equidistantly positioned upper and lower channels, which mate to form the plurality of conduits.

7. The drone of claim 1, wherein the internal platform comprises a plurality of cribs, each crib disposed to secure a corresponding turbine and directs the turbine's airflow toward a corresponding conduit.

8. The drone of claim 7, wherein the internal platform comprises a plurality of cavities.

9. The drone of claim 1, wherein each arm comprises:
    a cylindrical channel; and
    a tapered channel.

10. The drone of claim 9, wherein the cylindrical channel comprises a base portion of the arm, which attaches to the main housing unit by sliding over one of the conduits.

11. The drone of claim 10, wherein the tapered channel comprises:
    an airflow passage, whose cross-sectional area decreases as air moves from the cylindrical channel to the nozzle.

12. The drone of claim 11, wherein the closed portion of the upper passage comprises:
    a sealed volume of the upper passage, which prevents air flow through the outer channel along a portion of the circumference of the nozzle.

13. The drone of claim 12, wherein the outer channel formed by an upper lip is a curved surface extending downward from the top of the nozzle around the entire circumference of the nozzle.

14. A drone, comprising:
    a bowl-shaped top shell interrupted at an apex by an air intake unit, and interrupted along the top shell's outer rim by a plurality of upper channels comprising arches with convex sides facing the same direction as the convex side of the top shell; and, a plurality of conduit rims, each conduit rim forming around each upper channel; and, each conduit rim comprising a border for receiving a corresponding fastener of an arm;
    a bowl-shaped bottom shell interrupted at an apex of its convex side by a plurality of outwardly splayed legs; and, the bottom shell being further interrupted along its rim by a plurality of lower channels comprising arches with convex sides facing the same direction as the convex side of the top shell; and, a plurality of conduit rims, each conduit rim forming around each lower channel; and, each conduit rim comprising a border for receiving a corresponding fastener of an arm;
    an internal platform comprising a circular outer rim interrupted by a plurality of turbine cribs, comprising cavities in the internal platform; and, a plurality of cavities disposed between each turbine crib; and a vertically disposed tenon spanning the circumference of the internal platform on the top side of the internal platform; the tenon comprising a plurality of perpendicularly inward facing notches, each notch intruding upon the cavities for receiving a corresponding fastener for attaching internal components;
    a plurality of turbines comprising ducted fans, each turbine being suspended in one of the turbine cribs facing radially outward, and fixed to the internal platform by a bracket on two sides;
    a plurality of arms, each arm comprising a cylindrical channel, which slides over a conduit formed by mating the upper and lower shells; and, each arm comprising a tapered channel, which decreases in cross-sectional area in the direction of airflow between the arm and the nozzle;
    a nozzle comprising the end of each arm, each nozzle comprising a cylindrical ring comprising an upper passage comprising the uppermost volume of space inside the nozzle directly adjacent to an outer channel, wherein airflow may enter the upper passage through a junction and exit out of the outer channel; and the nozzle comprising an inner chamber comprising the vertical length, spanning from the bottom of the nozzle to the bottom of the upper passage, and the entire circumferential length of the nozzle; the outer channel formed by an upper lip; and, a closed portion of the upper passage, wherein the closed portion of the upper passage further comprises a sealed volume of the upper passage, which prevents air flow through the outer channel along a portion of the circumference of the nozzle, and wherein the outer channel formed by an upper lip comprises a curved surface extending downward from the top of the nozzle around the entire circumference of the nozzle.

\* \* \* \* \*